United States Patent [19]

Dakss et al.

[11] 3,999,841
[45] Dec. 28, 1976

[54] METHOD FOR FORMING AN OPTICAL FIBER CONNECTOR

[75] Inventors: Mark L. Dakss, Waltham; Andrew Bridger, Brighton; Hubert J. Ramsey, Burlington, all of Mass.

[73] Assignee: GTE Laboratories Incorporated, Waltham, Mass.

[22] Filed: May 21, 1975

[21] Appl. No.: 579,648

Related U.S. Application Data

[62] Division of Ser. No. 498,802, Aug. 19, 1974, Pat. No. 3,902,784.

[52] U.S. Cl. .............................. 350/320; 350/96 C
[51] Int. Cl.$^2$ ........................................... G02B 5/14
[58] Field of Search ............... 350/320, 96 C, 96 R, 350/96 WG, 81; 29/630 R

[56] References Cited
UNITED STATES PATENTS 3,628,036   12/1971   Humphrey ...................... 350/96 C
3,734,594   5/1973   Trambarulo ...................... 350/96 C

*Primary Examiner*—John K. Corbin
*Assistant Examiner*—Jon W. Henry
*Attorney, Agent, or Firm*—Irving M. Kriegsman; Bernard L. Sweeney; Robert A. Seldon

[57] ABSTRACT

A method and an apparatus for forming an optical fiber connector are described. The optical fiber connector is formed by locating a main body for the connector so that a predetermined relationship is established between an axis and at least two external surfaces of the main body. The optical fiber is then positioned in a precise position with respect to the axis; hence, it is also precisely located relative to the two external surfaces. Finally, the optical fiber is secured firmly to the main body. The optical fiber connector so formed is capable of being mated to another similarly mounted optical fiber connector by use of the two external surfaces to provide a highly efficient optical coupling junction.

7 Claims, 8 Drawing Figures

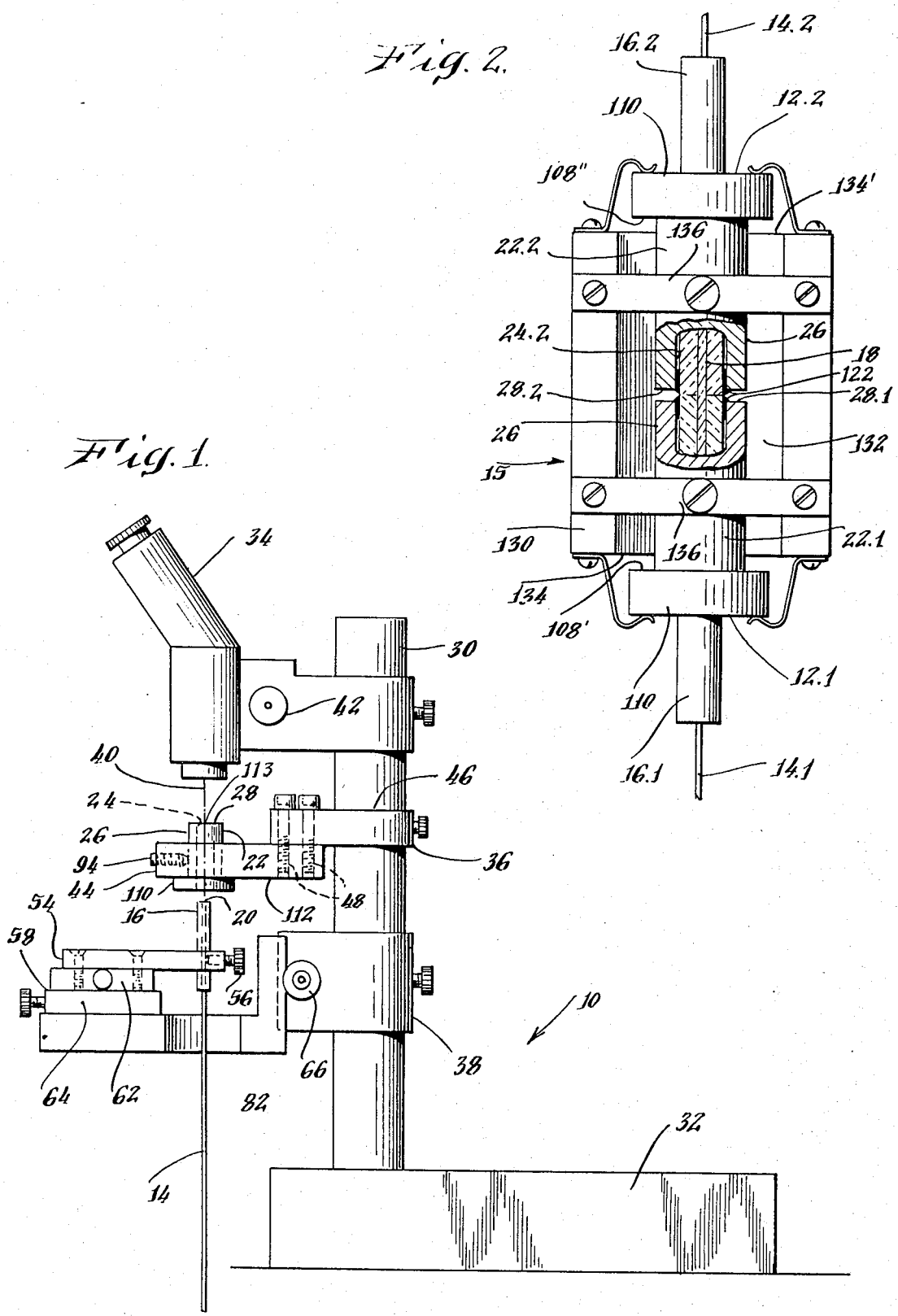

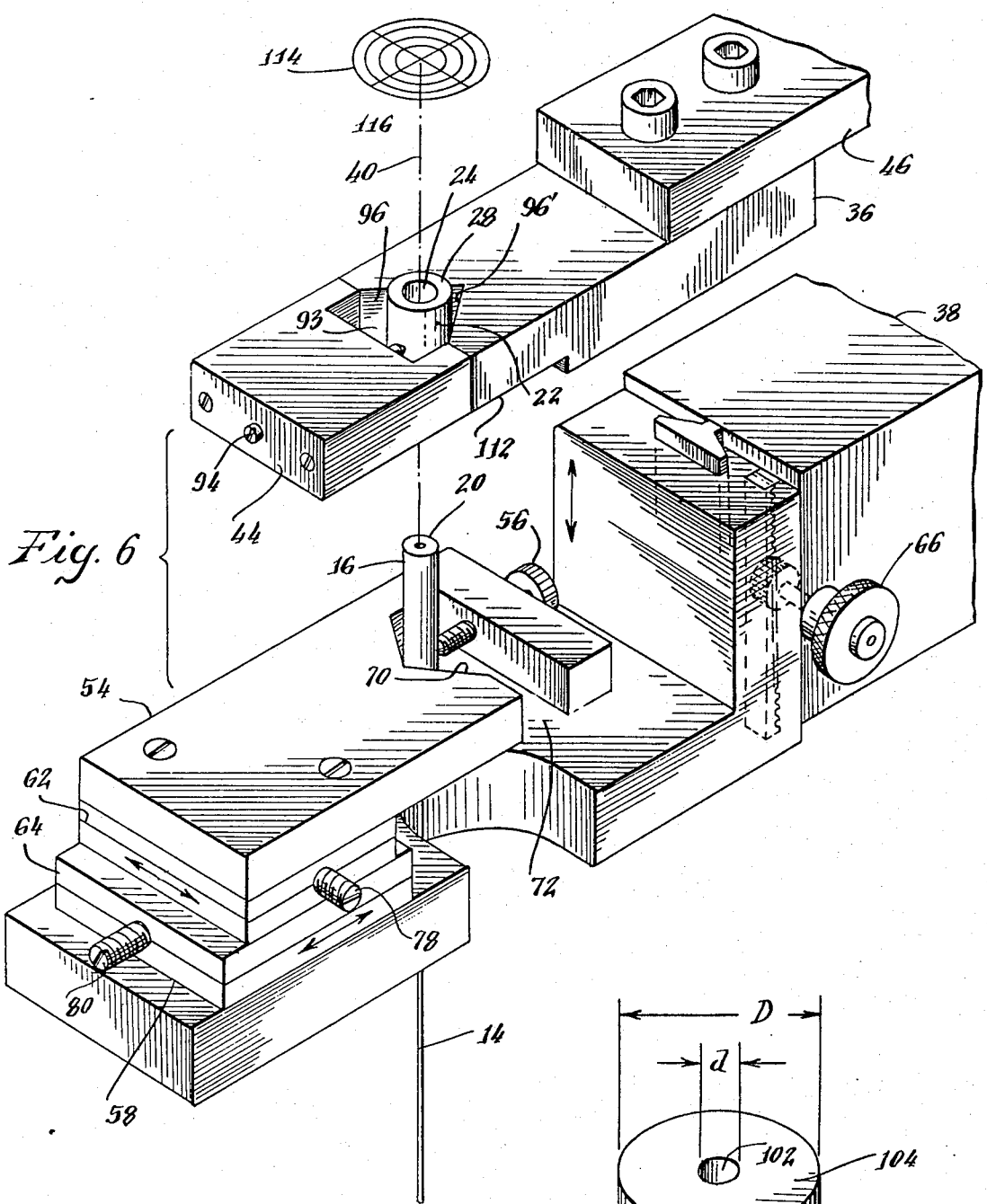

METHOD FOR FORMING AN OPTICAL FIBER CONNECTOR

This is a division of application Ser. No. 498,802 filed Aug. 19, 1974, now U.S. Pat. No. 3,902,784.

BACKGROUND OF THE INVENTION

This invention relates generally to a method and an apparatus for forming an optical fiber connector and is more particularly concerned with such a method and apparatus which simply and accurately form optical fiber connectors which are highly efficient and convenient to use in a normal operating environment, whether in the field or in the laboratory.

A recent development in the communication systems involves the use of optical fibers for very high bandwith communication channels. The use of such optical fibers which carry light energy distributed over a small area, has led to a need for a coupler which can conveniently and efficiently couple a pair of optical fibers to each other. The difficulty in accomplishing this end is directly attributable to the cross-sectional dimensions of the optical fibers. The dimensions for the light carrying portion of the optical fiber commonly are on the order of 50 micrometers.

The coupling of optical fibers involves generally precise mechanical control of the alignment of the optical fibers to achieve low coupling losses. Furthermore, for such optical communication systems to be of general utility, the couplers associated therewith must be such as to be adaptable to use in the field. Therefore, the couplers must be rugged, yet simple in construction so as to provide physical protection for the actual optical fibers, yet allow for quick and convenient operation of the coupling function.

Such a coupler and connector are disclosed and claimed in a separate patent application entitled "Optical Fiber Connector and Coupler" by Dakss et al., which is filed concurrently with the instant application, now issued as U.S. Pat. No. 3,914,880, and which has a common assignee. The optical fiber connector has external surfaces which are accurately finished and mate with other such surfaces in the coupler body to enable completed optical fiber couplers to establish highly efficient optical coupling between associated pairs of optical fibers. In one form of the optical fiber coupler, grooves are used to support and align pairs of connectors. In another optical fiber coupler, a machined hole enables a pair of optical fiber connectors to be accurately aligned in an abutting relationship.

SUMMARY OF THE INVENTION

It is, therefore, an object of the present invention to provide a novel method and apparatus for forming optical fiber connectors in which the position of the optical fiber in the connector is indexed to a pair of external surfaces so that efficient and reliable optical coupling to similarly mounted optical fibers may be had.

It is another object of the present invention to provide such a novel method and apparatus which are simple to perform and operate either in a manufacturing or a field environment.

Accordingly, the invention in its broadest aspects comprises a novel method and apparatus for forming optical fiber connectors. The apparatus includes a support and a microscope having an optical axis and attached to the support, the optical axis extending generally vertically along the support. An optical fiber connector main body fixture is attached to the support for positioning an optical fiber connector main body on the optical axis. The fixture is adapted to define controllably a relationship between the optical axis and a preselected external surface of the optical fiber connector main body. An optical fiber fixture is also attached to the support for positioning an optical fiber relative to the optical axis. The optical fiber fixture is moveable laterally to and along the optical axis relative to the microscope and the optical fiber connector main body fixture so that an optical fiber may be located within the optical fiber connector main body. Finally, means are associated with the microscope for determining the location of the optical fiber relative to the external surface on the optical fiber connector main body.

The method includes the steps of defining an axis and positioning an optical fiber connector main body such that a first external surface thereof is in a predetermined relationship to the axis and a second external surface is in a predetermined relationship to a point on the axis. An optical fiber is aligned parallel to the axis and is positioned along the axis so that it is in juxtaposition to the optical fiber connector main body over a portion of its length and an end of the optical fiber is approximately at the point on the axis. The optical fiber is then secured to the optical fiber connector main body to form an optical fiber connector in which the position of the optical fiber is in a known relationship to at least two external surfaces thereby allowing for precise optical coupling with another similarly formed optical fiber connector.

These and other objects, advantages and features of the invention will be apparent from the following detailed description of the preferred embodiments taken together with the accompanying drawing.

BRIEF DESCRIPTION OF DRAWING

In the drawing,

FIG. 1 is a side view of an instrument according to the present invention used in forming an optical fiber connector;

FIG. 2 is an enlarged top view which is partially broken away of a pair of optical fiber connectors in an optical fiber coupler;

FIG. 6 is an enlarged, exploded, perspective view of a portion of the optical fiber connector assembly instrument as shown in FIG. 1;

FIG. 7 is an enlarged perspective view of a dummy connector main body employed in the assembly of an optical fiber connector main body to an optical fiber.

DETAILED DESCRIPTION OF THE PREFERRED EMBODIMENTS

Figure 3:
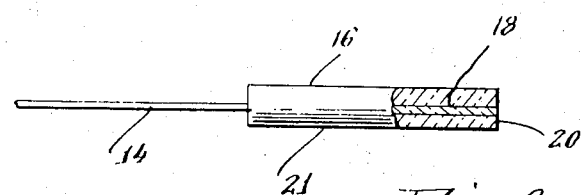
FIG. 3 is a greatly enlarged side view, partially broken away of a capillary sleeve employed in the optical fiber connector shown in FIG. 2.

In referring to the several figures of the drawing, like reference numerals are used to refer to identical parts of the apparatus described.

Referring initially to FIGS. 2 through 5, there is shown an optical fiber connector 12 and an optical fiber coupler 15. The optical fiber connector 12 includes an inner sleeve 16 having an axial through bore 18 to receive an optical fiber 14. The inner sleeve 16 is formed generally of a rigid material such as a glass. The bore 18 is somewhat larger in diameter than the optical fiber 14 to facilitate the assembly thereof but keeps the optical fiber positioned relatively close to the axis of the inner sleeve 16, such that the axis of the optical fiber 14 remains essentially parallel to the axis of the inner sleeve 16.

Figure 5:
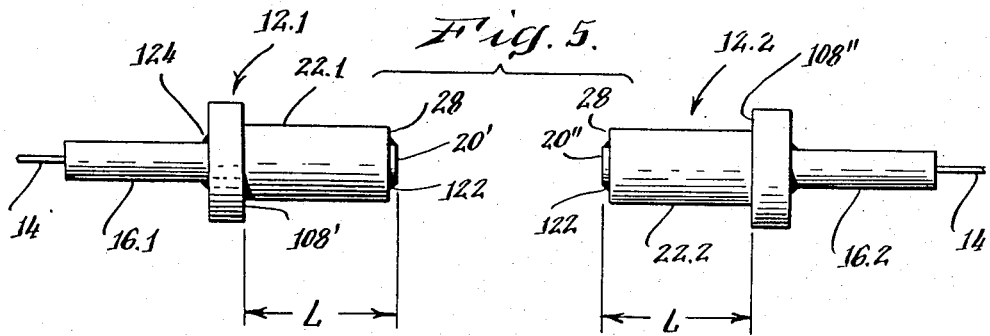
FIG. 5 is an exploded view of an associated pair of opposed optical fiber connectors.

The inner sleeve 16 is affixed to the optical fiber 14 with a suitable adhesive so that firm interconnection is obtained between the optical fiber 14 and the inner sleeve 16 at a first end 20 of the inner sleeve 16. An example of a suitable, commercially available adhesive is Eastman 910, a product of Eastman Kodak Co., Rochester, N.Y. The inner sleeve 16.1, see FIG. 5, is selected with a capillary sized bore which is generally parallel, perferably to within about 1°, with the outer cylindrical surface 21 to assure that the bores of a pair of opposed optical fiber connectors, such as 12.1 and 12.2 in FIG. 5, and, therefore, the contained optical fibers are sufficiently parallel to permit efficient optical coupling.

The parameters which control the coupling efficiency are the relative positions of the axes of the optical fibers, the parallelism of these axes and losses through reflection at the coupling interfaces. The optical fiber 14 tends to locate itself along a wall of the bore 18 thereby aligning itself closely parallel to the axis of the bore 18 so long as the bore is not greatly oversized relative to the optical fiber.

The inner sleeve 16 is mounted in the connector 12 which is formed of an optical fiber connector main body 22 having a through bore 24. The bore 24 is sized to receive freely the inner sleeve 16. The bore 24 is sufficiently oversized relative to the inner sleeve 16 so that a predetermined dimensional relationship may be established between the optical fiber 14 and an external surface of the optical fiber connector main body 22. Here, the optical fiber connector main body 22 has a generally right circular cylindrical shape over a major portion of its length. The external surface 26 over that portion is controlled to a uniform diameter and the optical fiber 14 is centered with respect thereto. However, as will be readily seen, other external surfaces or shapes may also be used to index the fiber location, for example, a planar surface on the optical fiber connector main body 22.

The connector main body 22 may be formed with a rear seating and holding shoulder 110 having a bearing surface 108' thereon adjacent to and generally extending normally from the external surface 26. The shoulder 110 serves to provide a convenient handling surface and protection for the more precise surface 26 as well as a locating function during assembly as will be discussed hereinbelow.

The inner sleeve 16 is affixed to the connector main body 22 with a suitable adhesive such as an epoxy as shown in FIG. 5 by reference numeral 122. The inner sleeve protrudes slightly from the end surface 28 of the main body member 22 to allow for mating of the optical fiber 14 to a similarly mounted fiber in an abutting relationship. In addition, a similar bond 124 may be made at the opposite end of the main body 22. In this manner, the optical fiber 14 is controlled closely relative to the external surface 26.

Figure 4:
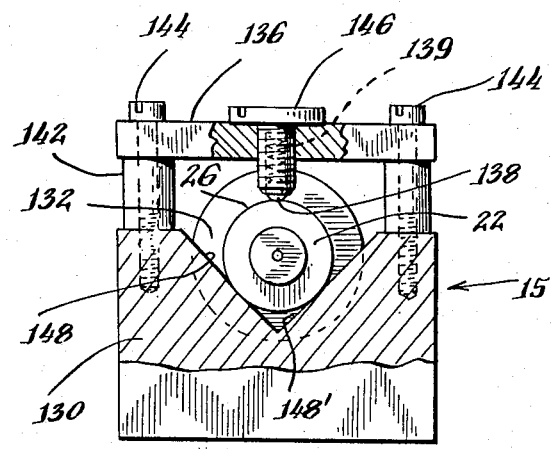
FIG. 4 is an end view of an optical fiber connector assembled in an optical fiber coupler.

Referring now to FIGS. 2 and 4, an optical fiber coupler 15 includes a rigid block 130 across which is provided a channel 132 extending between the opposite ends 134 and 134'. The channel 132 is preferably V-shaped to accommodate the circularly cylindrical main bodies 22 of a pair of opposed, juxtaposed optical fiber connectors 12, although other channel shapes may be used. The groove 132 is selected in length so that the first ends 20 of the inner sleeves 16 which locate the optical fibers 14 may be brought into close proximity or an abutting relationship.

A retainer strap 136 is removably affixed to the block 130 to retain the connector 12 in the coupler 15. The strap is located generally transverse to groove 132 and above the optical fiber connector 12 to position the opposed optical fibers 14.1 and 14.2 in an operative relationship.

As shown in FIG. 4, a means 146 is provided for spring biasing the optical fiber connector 12 against the operative surfaces 148 and 148' of the V-grooved channel 132. The means 146 may be, for example, a screw such as is shown in FIG. 4 which provides pure radial loading against the optical fiber connector 12 thereby forcing the connector firmly and equally against both V-groove surfaces. Such a screw includes a captive spherical ball 138 in the tip which is longitudinally biased by an internal coil spring 139.

Figure 8:
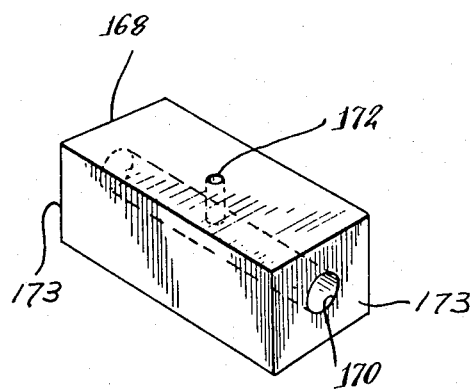
FIG. 8 is a perspective view of another embodiment for an optical fiber coupler block.

A further alternate arrangement for an optical fiber coupler block is shown in FIG. 8. The channel 132 in FIG. 2 is replaced by a tight-fitting through hole channel 170 sized to receive a pair of optical fiber connectors 12 from the opposite ends 173. The channel 170 has a centrally located hole 172 for allowing air to escape as the connectors 12 are inserted in the channel 170.

Referring now to FIGS. 1 and 6, an instrument 10 according to the present invention is shown which is useful for forming optical fiber connectors.

The instrument 10 includes a vertical support column 30 mounted on a base 32. The column 30 supports an alignment microscope 34, an optical fiber connector main body fixture 36, and an inner sleeve or optical fiber fixture 38. The alignment microscope 34 has an optical or viewing axis 40 which is generally parallel to the column 30. In this embodiment, the alignment microscope 34, the optical fiber connector main body fixture 36, and the optical fiber fixture 38 are each relatively rotatable about and slidable vertically along the column 30 for approximate positioning of the various optical fiber connector components.

The optical fiber connector main body fixture 36 and the optical fiber fixture 38 have incorporated therein means 48 and 58 respectively for making horizontal adjustments in position relative to the axis 40. The particular means here shown and described are merely exemplary of the devices which may be used for this purpose. In the optical fiber connector main body fixture 36, the means 48 consists of a set of oversized holes or slots in a first horizontally extending member 46 associated with a pair of screws threaded into a second horizontally extending member, such as a plate, 44. After final positioning, the means 48 also serve to lock the fixture 36 in position horizontally.

The inner sleeve or optical fiber fixture 38 includes a planar translator 58 for adjustment of position normal to the axis 40. By turning the control screws 78 and 80, the plates 62 and 64 respectively are moved in orthogonal directions. The plane of movement is essentially normal to the axis 40.

The microscope 34 may be either monocular or binocular as desired. The magnification of the objective and eyepiece are a matter of selection and depend on the size of the optical fiber to be mounted in the optical fiber connector main body and the degree of accuracy desired. Preferably, for purposes that will be more fully discussed hereinbelow, the microscope should have a narrow depth of focus. A means 42 is provided for moving the microscope 34 initially relative to the support column 30 and along the axis 40.

The optical fiber connector main body fixture 36 includes means for positioning an optical fiber connector main body 22 therein in a predetermined manner relative to the axis 40 and thereafter holding the optical fiber connector main body in that position. In the case where the optical fiber connector main body 22 is of a right circular cylindrical form, the preferred arrangement is a V-shaped mounting groove 93 having planar, vertically oriented side surfaces 96 and 96'. A retainer 94 such as a nylon tipped screw may be used to hold a optical fiber connector main body 22 against the surfaces 96 and 96'. In this manner, the axis of the cylindrical optical fiber connector main body 22 may be oriented parallel to the axis 40.

A similar means is associated with the optical fiber fixture 38. A plate 54 is affixed to the translator upper plate 62 and includes a V-groove 70 and a retainer screw 56. A lateral opening 72 in the plate 54 provides access to the V-groove 70 regardless of the length of the optical fiber to which an optical fiber connector main body is to be assembled.

In addition, the optical fiber fixture 38 has a means 66 for moving an optical fiber 14 longitudinally along the axis 40. A typical such means is a rack and pinion arrangement.

In operation, a dummy connector main body 98, such as shown in FIG. 7 is first mounted in the optical fiber connector main body fixture 36 for aligning that fixture with the microscope 34. The dummy connector main body 98 is formed with the same configurational constraints as the optical fiber connector main body 22 except that instead of having a hollow interior a means 102 is provided thereon for indexing the dummy connector main body 98 to the axis 40. Hence, when an actual optical fiber connector main body is inserted in place of the dummy connector main body 98, the optical fiber connector main body 22 is indexed similarly to the axis 40.

The specific dummy connector main body 98 shown in FIG. 7, is complimentary to the optical fiber connector main body 22 shown in FIGS. 1, 2, 4 and 5. The outer circularly cylindrical surface 100 is of the same diameter as the external surface 26 on the optical fiber connector main body 22. A rear cylindrical shoulder 111 is found on the dummy connector main body 98 which is similar to the shoulder 110. The forward surface 108 of the dummy connector main body is disposed at a distance L from the front face 104. The distance L corresponds to the length from the front shoulder surface 108' to the end 20' of the inner sleeve assembly 16.1 as shown in FIG. 5. A hole 102 is formed at a desired location such as concentrically with the surface 100 in the front face 104. This relationship is used, in conjunction with front face 104. This relationship is used, in conjunction with the microscope 34, to position the optical fiber connector main body fixture 36 relative to the axis 40.

The dummy connector main body 98 is emplaced in the optical fiber connector main body fixture 36 with the shoulder surface 108 abutting the lower surface 112 of the outwardly extending plate 44. The retaining screw 94 is utilized to seat the dummy connector main body 98 against the V-groove surfaces 96 and 96' so that the axis of the dummy connector main body 98 is positioned generally parallel with the axis 40. The optical fiber connector main body fixture 36 is capable of being moved along and rotated about the column 30 to a general location at which the axis of the dummy connector main body 98 and the axis 40 are approximately aligned. At this time the optical fiber connector main body fixture 36 is fixedly secured to the column 30. However, where desired, the column mounted components may be prepositioned at the time of assembly of the instrument. In such an instrument, the components need not be movable relative to the support.

The microscope 34 has a means 114 associated therewith for determining the location of the optical fiber relative to the external surface on the optical fiber main body 22. In the preferred embodiment shown in FIG. 6, that means takes the form of a reticle 114 located at an intermediate image plane in the microscope 34. In the form shown in FIG. 6, the reticle 114 consists of a series of concentric rings superimposed on a pair of crossed lines. The reticle 114 is aligned with the image of the hole 102 so that that image also appears concentric in the eyepiece of the microscope 34. At this time, the surfaces 96 and 96' on the optical fiber connector main body fixture 36 are positioned precisely with respect to the axis 40 so that when a main body 22 is substituted therein, the same relationship again exists; for example, the axis 40 lies along the axis of the optical fiber connector main body 22.

In addition the microscope 34 includes means for defining a point 113 on the axis 40 at which the end of the optical fiber 14 is to be located, which point has a specific predetermined relationship to the optical fiber connector main body fixture 36, the optical fiber connector main body 22, or the dummy connector main body 98. That means, in the present enbodiment, is the provision of a narrow depth of focus for the microscope 34. Ideally, that depth of focus should be of the order of a few mils. Hence, when aligning the optical fiber connector main body fixture 36 by using the dummy connector main body 98, if the rim of the hole 102 is in sharp focus and the microscope and fixture are fixed in position, a point 113 is defined on the axis 40 which has a definite relationship to the bottom surface 112 of the holding plate 44. The relationship is the aforementioned distance L.

The dummy connector 98 is now removed and is replaced with an optical fiber connector main body 22, whose shoulder 110 also has a locating surface 108' which is brought into contact with surface 112, thereby establishing the length L between the point 113 and the external surface 108' on the main body 22.

An optical fiber 14, either with or without a protective inner sleeve 16 as desired is then placed in the optical fiber fixture 38 and is positioned roughly on the axis 40. The fiber is then moved along the axis 40 until the end 20 thereof enters the object plane of the microscope 34. At this point, the end of the optical fiber 14 is approximately at the point 113. By adjusting the translator 58, the end 20 can be brought into a concentric relationship with the reticle 114 thereby accurately defining the relationship between the optical fiber 14 and the external surface 26.

When a protective inner sleeve 16 is used, the end 20 of the sleeve 16 and optical fiber 14 should first be polished before insertion into the main body 22. This provides for more efficient coupling of light energy from one optical fiber to another. The optical fiber end can also be prepared by breaking after scoring if an index matching fluid is interposed between ends of the associated fibers when used in a coupler.

The fiber 14 is secured to the main body 22 by use of a suitable adhesive such as shown at 122 in FIGS. 2 and 5.

Preferably, the adhesive is a low shrinkage, and quick setting epoxy such as Allabond 20/20 Epoxy sold by Allaco Products Division of Bacon Industries, Inc. of Watertown, Massachusetts. In addition, a second application of adhesive may be made at the rear of shoulder 110 as shown at 124 in FIG. 5.

Optical fiber connectors 12 assembled using methods and apparatus according to the present invention have been extensively tested and have been found to achieve typical coupling efficiencies of 85% with individual instances exceeding 95% coupling efficiency.

While the foregoing description has been made in the context of producing connectors for optical fibers, it is within the purview of the present invention and included within the generic meaning of "connector" that any holder of an optical fiber may be assembled using the methods and apparatus described herein.

While there have been shown and described what are considered to be preferred embodiments of the present invention, it will be obvious to those of ordinary skill in the art that various changes and modifications may be made therein without departing from the spirit of the invention as defined in the appended claims.

We claim:

1. A method for forming an optical fiber connector comprising the steps of:
   establishing a pair of longitudinally extending intersecting reference planes;
   defining a longitudinally extending alignment axis between the planes and spaced at a reference distance from each plane;
   defining a reference point on the alignment axis;
   generally encompassing the alignment axis with an optical fiber connector main body positioned such that one end thereof is adjacent to the reference point and such that a pair of external longitudinally extending contact surfaces thereof are each in a tangential relationship with a different one of the planes;
   aligning an optical fiber parallel to the alignment axis;
   controllably positioning the optical fiber along the alignment axis so that the optical fiber is within the optical fiber connector main body over a portion of its length and an end of the optical fiber is approximately at the reference point; and
   securing the optical fiber to the optical fiber connector main body to form the optical fiber connector, whereby the resultant position of the optical fiber with respect to the contact surfaces allows for precise optical coupling with another similarly formed optical fiber connector.

2. The method according to claim 1, wherein the step of defining the alignment axis further comprises the steps of:
   mounting a dummy connector main body in an optical fiber connector main body fixture, the dummy connector main body having external longitudinally extending contact surfaces similar to those of the optical fiber connector main body and having means spaced a reference distance from each of the contact surfaces for locating the alignment axis; and
   relatively positioning a microscope and the location means so that the optical axis of the microscope essentially coincides with the alignment axis.

3. The method of claim 2, wherein the steps of defining the reference point comprises the steps of:
   observing the location means on the dummy connector main body with a microscope having a narrow depth of focus; and
   relatively positioning the microscope and the location means so that the location means is within the depth of focus of the microscope.

4. The method according to claim 3, wherein the optical fiber is positioned with respect to the reference point by:
   mounting the optical fiber in an optical fiber fixture so that the optical fiber is parallel to the optical axis; and
   moving the optical fiber parallel to the optical axis until the end of the optical fiber falls within the depth of focus of the microscope.

5. A method for forming an optical fiber connector according to claim 4, wherein the optical fiber is aligned with the optical axis by
   translating the optical fiber normal to the optical axis until the optical fiber lies therealong as observed with the microscope.

6. A method for forming an optical fiber connector according to claim 5, wherein the additional step of first mounting the optical fiber in a rigid inner sleeve is performed.

7. A method for forming an optical fiber connector according to claim 6, wherein the assembly of the optical fiber and rigid inner sleeve is polished on one end thereof, the end being that positioned at the point on the axis.

* * * * *